Nov. 7, 1961  B. P. CHIRON  3,008,096
SHORT-CIRCUIT DEVICES FOR ULTRA-HIGH FREQUENCY WAVE GUIDES
Filed May 23, 1960  3 Sheets-Sheet 1

3,008,096
SHORT-CIRCUIT DEVICES FOR ULTRA-HIGH FREQUENCY WAVE GUIDES

Bernard Pierre Chiron, Paris, France, assignor to Lignes Telegraphiques & Telephoniques, Paris, France
Filed Mar. 23, 1960, Ser. No. 16,997
Claims priority, application France June 3, 1959
9 Claims. (Cl. 333—7)

The present invention relates to a new type of short-circuit device adapted to be inserted in a wave guide for ultra-high frequency electromagnetic waves and the operation of which can be controlled by the application to a body of ferromagnetic material such as ferrite of a magnetic polarization field obtained from an electromagnet in the winding (or windings) of which a direct current can be established at will. The device of the invention is useful for the building of such apparatus as multidirectional switches for ultra-short wave systems and may be combined for various purposes with circulators, resonant cavities, filters and other elements of ultra-high frequency circuits, where it plays the same part as gas-filled diodes (also known as T-R switches) do in conventional systems.

It has been experimentally found that the system of the invention is capable of satisfactorily operating at frequencies of some thousands and even some tens of thousands of megacycles per second in a rectangular cross-section wave guide propagating TE waves, in particular $TE_{10}$ waves.

Ferrite cut-off switches are already known in the art. Such an apparatus is, for instance, described by R. F. Soohoo in a paper published in the I.R.E. Transactions, volume MTT–7, July 1959, pp. 332–336. However, it will appear from the hereinafter given description that, in the device of the invention, the arrangement of both ferromagnetic material and polarizing field is quite different from those used in the formerly known systems.

The operation of the device of the invention takes advantage of the socalled "magnetostatic oscillations" which occur, under suitable conditions, in a body of ferromagnetic material, such as ferrite, which exhibits gyromagnetic properties when submitted to a polarizing magnetic field of properly chosen intensity. The nature and theory of such oscillations have been explained by L. R. Walker in a paper entitled "Magnetostatic Modes in Ferromagnetic Resonance," published in the Physical Review, January 15, 1957, pp. 390–399. Although this author's analysis is, to a certain extent, restricted to the case of a spheroidal magnetic body, its principles apply to other cases. The essential results of this analysis may be summarized as follows:

When a body of gyromagnetic material is submitted to the simultaneous action of a D.-C. polarizing magnetic field and of an external high frequency alternating field, non-uniform alternating fields are produced inside the material. Under very broad conditions, it can be assumed, at least at the usual frequencies of some thousands or some tens of thousands megacycles per second, that the internal alternating magnetic field is the gradient of a scalar magnetic potential. According to well-known boundary conditions, the value of this potential must be continuous through the surface of the magnetic material body, as well as those of the tangential component of the magnetic field and of the normal component of the corresponding magnetic induction. If the external alternating field is that of a wave guide, which is iself subject to special boundary conditions imposed by the geometry of the system, certain restrictive conditions relating to the field distribution inside the magnetic material must necessarily be fulfilled. At a given frequency, such conditions depend on one hand on the geometrical shape of both guide and magnetic material body, and on the other hand on a general partial differential equation, the form of which in turn mainly depends on the value of the magnetic permeability of the material at the working frequency and for the given polarizing field intensity. More precisely, as, owing to the gyromagnetic effect, the magnetic permeability of the material is no longer represented by a mere number, but by the components of an antisymmetrical tensor, the coefficients of this partial differential equation depend on the ratio of the alternating magnetic induction measured in any direction perpendicular to the polarizing field to the alternating magnetic field measured in the same direction. This ratio will be hereinafter designated, for lack of a better term, as the "main permeability component." It is well known that when, for a given polarizing field, the working frequency is varied from zero upwards, the "main permeability component," starting from a positive value for the lower frequencies, decreases and even assumes negative values for frequencies higher than the gyromagnetic resonance frequency corresponding to the intensity of said polarizing field. On another hand, if, for a constant working frequency, the polarizing field is varied from zero upwards, the apparent permeability decreases from an initial value of some units to zero and to negative values, which are reached for polarizing field intensities noticeably lower than that which corresponds to gyromagnetic resonance at said working frequency.

The form of the above-said partial differential equation (which is shown as Equation 9, page 391, of the above-mentioned paper by L. R. Walker) is such that, for a given constant main permeability component, i.e. for given constant frequency and polarizing field values, the solution of this equation must fulfil certain conditions relating to geometrical symmetry. In fact, it can be shown that this solution must be either symmetrical or antisymmetrical with respect to two planes making equal angles with the direction of the polarizing field. It can also be shown that the tangent of these equal angles is necessarily equal to the square root of the negative of the main permeability component.

This shows that, if field continuity with a wave normally propagating in a rectangular cross-section guide is to be ensured, and since the symmetry planes of such a wave are necessarily perpendicular or parallel to the longitudinal axis of the guide, coincidence of the symmetry planes of said wave and the internal high frequency field in the magnetic material can only exist if said angles are substantially equal to 45 degrees and if such planes are respectively parallel and perpendicular to said longitudinal guide axis. Consequently, the direction of the polarizing field should make an angle substantially equal to 45 degrees with the latter axis, and be, of course, parallel to a symmetry plane of the guide.

It has been found practically that the best performance of the system of the invention is obtained by taking for the ferromagnetic material body a circular cylindrical rod made of ferrite and having its main axis substantially perpendicular to the longitudinal axis of the guide and parallel to its broader lateral faces, said rod filling a substantial part of the cross-section of the guide. The advantage of this arrangement is related to the fact that a polarizing field with a uniform direction is more easily obtained in a cylindrical body by applying a D.-C. field perpendicularly to the revolution axis of said body, than in a body of any other shape, except a sphere.

Further theoretical analysis shows that, when the above-mentioned conditions relating to symmetry and polarizing field intensity as well as to potential and field continuity are fulfilled, there exists a definite value of this intensity for which the main component of the high frequency magnetic field, which is perpendicular to the longitudinal axis of the guide and parallel to the broader lateral faces thereof, becomes substantially zero on the external surface of the magnetic material, which then acts as a perfect magnetic reflector for the propagating waves.

The device of the invention essentially comprises a length of rectangular cross-section wave guide, a body of ferromagnetic material having gyromagnetic properties set up inside said guide length, switching means for impressing at will upon said body a substantially uniform D.-C. polarizing magnetic field in a direction making an angle comprised between 40 and 50 degrees with the longitudinal axis and substantially parallel to the narrower lateral faces of said guide, and means for adjusting the intensity of said polarizing field at a given intensity.

In a preferred embodiment of the invention, said ferromagnetic material body is made of a piece of ferrite in the shape of a circular cylindrical rod set up in said guide with its revolution axis substantially perpendicular to said longitudinal axis and symmetrically located with respect to the main symmetry axes of the cross-section of said guide, said rod filling a substantial part of said cross-section.

With these arrangements, said ferromagnetic body acts as a reflecting obstacle when submitted to said polarizing field, while, in the absence of said polarizing field, wave propagation is not noticeably altered by its presence. The input impedance of the guide length may thus be alternately made equal to the characteristic impedance of a main wave guide in which the device is inserted or to a practically zero impedance, equivalent to a short-circuit, for a suitable intensity of the polarizing field.

The advantages of the invention will be better understood from the hereinafter given detailed description of some non-limitative examples of its embodiments and from the annexed drawings, in which.

Figure 1:
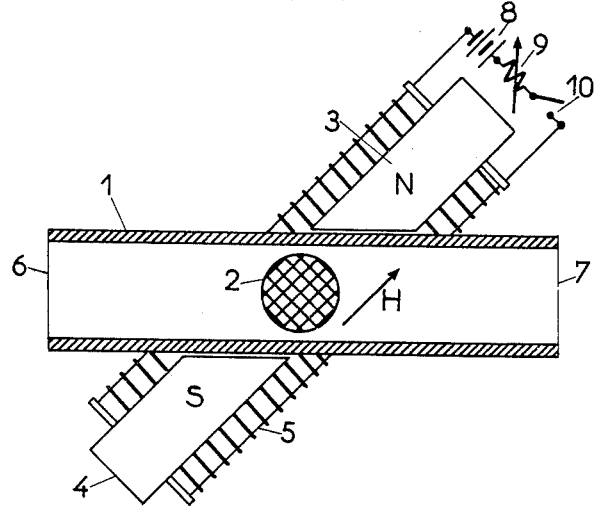
FIGS. 1 and 2 are two different views of a short-circuit device according to the invention in its simplest form.
Figure 2:
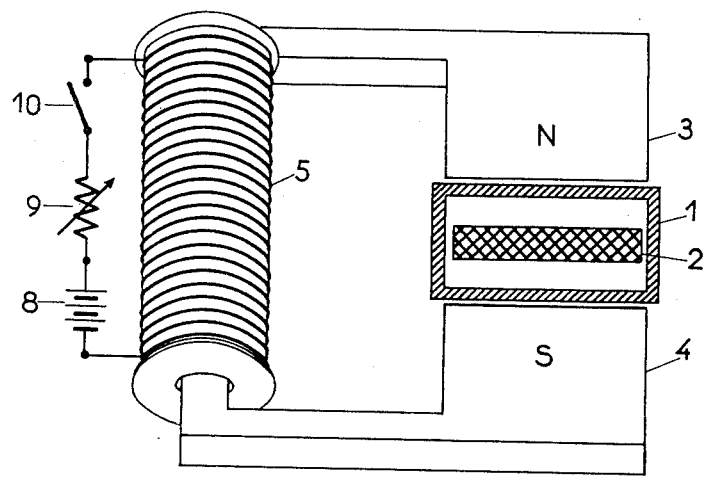

Referring to FIGS. 1 and 2, which respectively show, the first one a short-circuit device according to the invention, partly in cross-section in a symmetry plane of the guide parallel to its narrower lateral faces and partly in projection on the same plane, and the second one another view of the same device, partly in cross-section in a plane perpendicular to the longitudinal axis of the guide and partly in projection on the latter plane, it may be seen that this device essentially comprises:

A length of rectangular cross-section wave guide 1 with two openings 6 and 7 at its ends.

A circular cylindrical ferrite rod 2 set up in said guide length with its revolution axis perpendicular to the narrower lateral faces of said guide and in a symmetrical position with respect to its cross-section.

An electromagnet N–S with pole pieces 3 and 4 and an energizing winding 5 for establishing a polarizing D.-C. magnetic field H in the oblique direction shown in FIG. 1.

Means comprising a D.C. source 8, an adjustable resistor 9 and a switch 10 for establishing at will a direct current in winding 5.

When no current flows through 5, no polarizing field exists in the ferrite rod 2. Experience shows that, with ferrites of the type commonly used in ultra-high frequency systems, in the 10,000 mc./s. band for instance, the permeability and permittivity of the ferrite, expressed in electromagnetic and electrostatic units respectively, are of the order of magnitude of a few units, and that the presence of the ferrite rod does not appreciably affect the propagation of a wave in the guide.

In fact, it has been found that with a standard guide for the X-band having a 0.9 by 0.4 inch cross-section and operated at 9,400 mc./s., and with a ferrite rod filling most of the cross-section and made of a ferrite having the molecular composition (30% $Fe_2O_3$, 15% MnO, 55% MgO) the attenuation introduced in the guide does not exceed 0.18 decibel. This value has been measured with a ferrite rod having a length of 0.9 times the longer side and a diameter of 0.8 times the shorter side of the cross-section of the guide.

Now, when switch 10 (FIG. 1) is closed and the direct-current flowing through winding 5 given a suitable intensity with the aid of the adjustable resistor 9, the ferrite rod 2 acts as a nearly perfect reflector. In the above-mentioned conditions, a reflection coefficient of 0.98 has been measured, which corresponds to a standing wave ratio of 80 to 1.

This shows that the device of the invention can be substituted for a conventional T–R switch gas-filled tube, whose attenuation in the non-ionized state hardly falls, all other things being equal, below one decibel.

As it may be seen in FIG. 1, the polarizing field H should be oriented at an angle of 45° with respect to the longitudinal axis of the guide and parallel to the narrower lateral faces thereof. This is effected, in the devices of FIGS. 1 and 2, by means of suitably shaped pole pieces 3 and 4. In practice, the 45° value for this angle, although being the optimum value, is not a very critical one, and some value between 40° and 50° will do, possibly with some readjustment of the direct current intensity in winding 5. A convenient method for obtaining a suitable oriented field will be described later on.

The ferrite rod 2 of FIGS. 1 and 2 can be secured inside the guide by embedding it in some low permittivity dielectric material (such as polystyrene or polyethylene foam) filling the cross-section of said guide, or by any other method. For simplicity such arrangements are not shown in the drawing.

It has also been found that, although the ferrite rod should fill a substantial part of the guide cross-section, it is not absolutely necessary that the ratios of its dimensions to those of said cross-section be very close to unity. In practice it is sufficient, at least in the above-specified conditions, that the diameter of the rod be at least 0.65 times the shorter side and its length at least 0.8 times the longer side of said cross-section.

Figure 3:
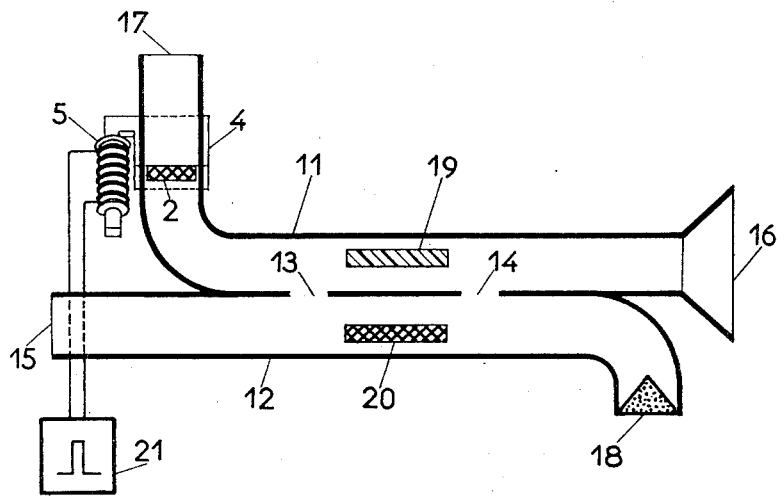
FIG. 3 shows a three-way wave guide switch (or "duplexer"), built from a short-circuit device as in FIG. 1 combined with a conventional circulator.

Referring now to FIG. 3, the latter figure shows in cross-section a "duplexer" incorporating a short-circuit device according to the invention. The main element of this duplexer is a conventional circulator with three ports 15, 16, 17. The latter consists of a pair of wave guides 11, 12 (shown in cross-section in a plan parallel to their broader lateral faces) mutually coupled by directional coupling slots 13, 14 and made non-reciprocal by inserting in said guides, between 13 and 14, a dielectric element 19 and a ferromagnetic element 20 giving the guides suitable phase shifts. The unused end of guide 12 is closed on a reflectionless termination 18. As it is well known, such a device is capable of transmitting high frequency energy with a low attenuation from 15 to 16, for instance, but only with a much higher attenuation from 16 to 15, and also with a low attenuation from 16 to 17 but only with a much higher attenuation from 17 to 16.

When it is desired to use 16, which may be connected, for instance, to an aerial, for alternate transmission and reception, a transmitter is connected to 15 and a receiver to 17. To protect the input of the receiver against too much applied power during the operation of the transmitter, it is necessary that port 17 be shorted during the corresponding time intervals. This can be effected with the aid of a short-circuit device according to the invention, consisting of a ferrite rod 2 and an electromagnet 4, 5 as in FIG. 1, fed from a D.-C. pulse source 21 also controlling the operation of the high frequency transmitter (not shown in the drawing). The energy reflected by 2 is then absorbed in the reflectionless termination 18. It has been found that, with the just described device, an attenuation of 70 decibels can be obtained between 15 and 17, at least for the above-mentioned frequencies of the X-band.

Figure 4:
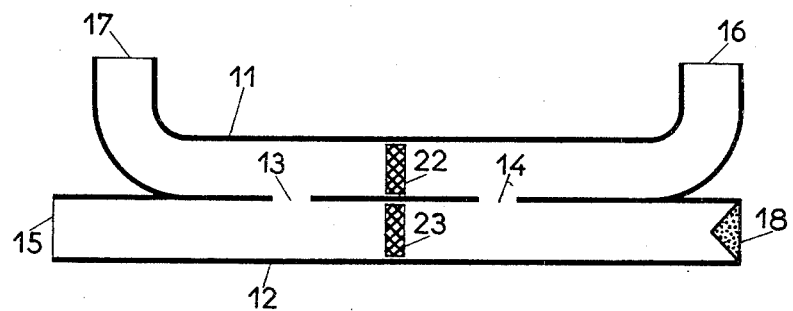
FIG. 4 shows another arrangement of a three-way switch which includes a pair of short-circuit devices of the type of FIG. 1.

A three-way switch incorporating a pair of short-circuit devices according to the invention is shown in FIG. 4. It also includes a pair of wave guides 11 and 12 (shown in cross-section in a plane parallel to their broader lateral faces) mutually coupled by two 3-decibel directional couplers 13 and 14, as in in FIG. 3, the system has three ports 15, 16 and 17. Short-circuit devices 22 and 23 according to the invention (shown in a very simplified manner in the drawing) are inserted in both guides between couplers 13 and 14. The unused end of guide 12 is closed on reflectionless termination 18. When the ferrite rods 22 and 23 are not magnetized, no short-circuit exists, and the normal operation of the directional couplers causes the whole of the high frequency energy entering 15 to be directed towards 16. On the contrary, when both 22 and 23 are in a short-circuit condition, this energy is directed toward 17, provided that 22 and 23 be located in the guides at suitably chosen distance from 13.

Figure 5:
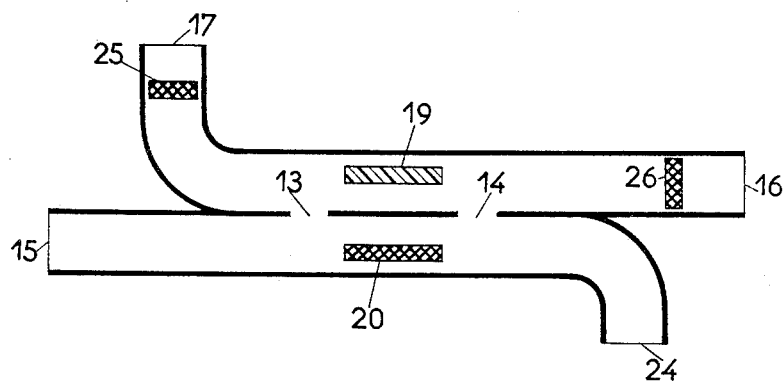
FIG. 5 shows a four-way switch also including a pair of short-circuit devices of the type of FIG. 1.

A similar representation of a four-way switch incorporating two short-circuit devices according to the invention is given in FIG. 5. Its operation is quite similar to that of the device of FIG. 3, except for the substitution of a fourth port 24 for the reflectionless termination 18 of FIG. 3, and for the presence of a second short-circuit device 26, the first short-circuit device 25 playing the same part as 2 in FIG. 3. It is easily seen that, if neither 25 nor 26 (FIG. 5) is magnetized, energy entering 15 issues through 16. If 26 is magnetized, the same energy issues through 17. If both 25 and 26 are magnetized, the energy issues through 24.

Figure 6:
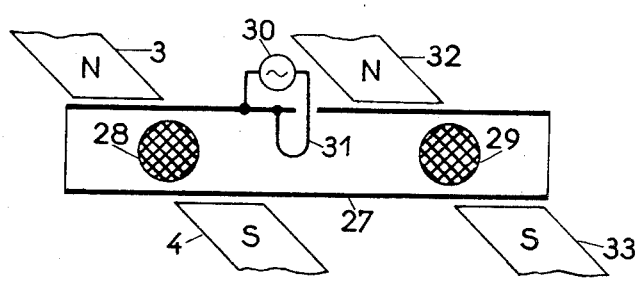
FIG. 6 shows a resonant cavity built from a wave guide length combined with a pair of short-circuit devices according to the invention.

FIG. 6 shows a resonant cavity made of a length of waveguide 27 terminated at either end by two short-circuit devices 28 and 29 according to the invention, the latter respectively consisting of the ferrite rods 28 and 29 magnetized by electromagnets, only the pole pieces 3, 4 and 32, 33 of which are shown in the drawing. The plane of FIG. 6 is that of a cross-section of the system through a plane parallel to the narrower lateral faces of the guide. When both 28 and 29 are magnetized, they act as short-circuits at the ends of 27, and the system operates as if it were closed at both ends by fully reflecting walls. In this condition, a resonant cavity is constituted, the resonance frequency of which depends on the transverse dimension of 27 and on the distance between 28 and 29. This cavity can be energized by a high frequency source 30 coupled thereto by a coupling loop 31. By varying the intensities of the polarizing fields applied to 28 and 29, the resonance frequency can be slightly adjusted. When 28 and 29 are not simultaneously magnetized, no resonance exists.

Figure 7:
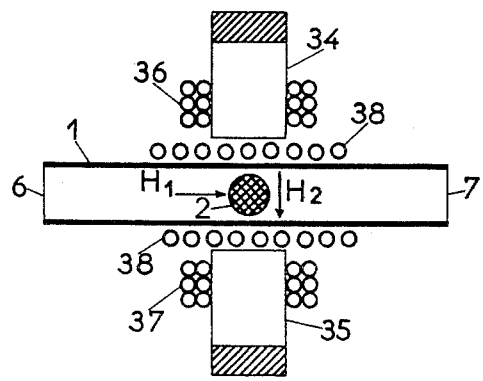
FIG. 7 shows a convenient arrangement for producing a polarizing magnetic field for the various devices of FIGS. 1 to 6.

A convenient method of securing a properly oriented D.-C. magnetic field for the various embodiments of the invention is shown in FIG. 7.

As it is not always easy to build pole pieces such as 3 and 4 of FIGS. 1, 2 and 6 in such a manner that they secure a field accurately oriented at 45° with respect to the longitudinal axis of the guide (or guides), an arrangement allowing a certain adjustment of the field as to its direction may be preferred. Such an arrangement is obtained in FIG. 7 with the aid of a first electromagnet consisting of pole pieces 34 and 35 and windings 36 and 37, providing a field $H_2$ perpendicular to the broader lateral faces of guide 1 (shown in FIG. 7 in cross-section in a plane perpendicular to said lateral faces), and of a second electromagnet which simply consists of a solenoidal winding 38 wound around guide 1 and providing a field $H_1$ parallel to the axis thereof. Proper adjustment of respective D.-C. currents in 36, 37 and 38 will supply a polarizing field of suitable intensity and direction to the ferrite rod 2.

What is claimed is:

1. A short-circuit device for an ultra-high frequency wave guide, comprising a length of rectangular cross-section wave guide, a body of ferromagnetic material having gyromagnetic properties positioned within said guide length, and means for impressing selectively upon said body a substantially uniform D.-C. polarizing magnetic field and for adjusting the intensity thereof, said means applying said field in a direction making an angle comprised between 40 and 50 degrees with the longitudinal axis of said guide and substantially parallel to the narrower lateral faces thereof; said body having the shape of a circular cylindrical rod having its revolution axis substantially perpendicular to the narrower lateral faces of said guide, and said body filling a substantial part but less than the whole of the cross-section of said guide and being located in a position substantially symmetrical with respect to the broader and narrower lateral faces of said guide.

2. A device as claimed in claim 1, wherein said ferromagnetic material is a ferrite.

3. A device as claimed in claim 1, wherein said means includes a D.-C. source, an adjustable resistor, a switch, and an electromagnet including at least one winding coupled to said D.-C. source via said adjustable resistor and switch.

4. A device as claimed in claim 1, wherein said means includes first and second electromagnets respectively providing a first magnetic field substantially parallel to the longitudinal axis of said guide and a second magnetic field substantially perpendicular to the broader lateral faces of said guide, and further means for feeding at least one winding in each one of said electromagnets with D.-C. current and for adjusting the intensity of said current.

5. A device as claimed in claim 1, wherein said means includes an electromagnet including at least one winding and a D.-C. pulse source coupled thereto.

6. A duplexer comprising a circulator having first, second and third ports each consisting of the end parts of rectangular cross-section guide lengths, wherein at least one of said lengths is provided with a short-circuit device comprising a further length of rectangular cross-section wave guide, a body of ferromagnetic material having gyromagnetic properties positioned within said further guide length, and means for impressing selectively upon said body a substantially uniform D.-C. polarizing magnetic field and for adjusting the intensity thereof, and wherein said means are so arranged that said field be applied in a direction making an angle comprised between 40 and 50 degrees with the longitudinal axis of said further guide length and substantially parallel to the narrower lateral faces thereof; said body having the shape of a circular cylindrical rod having its revolution axis substantially perpendicular to the narrower lateral faces of said guide, and said body filling a substantial part but less than the whole of the cross-section of said guide and being located in a position substantially symmetrical with respect to the broader and narrower lateral faces of said guide.

7. A three way ultra-high frequency switch comprising first and second rectangular cross-section guide lengths mutually coupled by two spaced slot systems forming two 3-db directional couplers and in which three of the end openings of said guide lengths constitute the three ports of said three-way switch, the fourth of said openings being closed on a reflectionless termination, wherein both of said guide lengths are provided with short-circuit devices located between said slot systems, each one of said short-circuit devices comprising a further length of rectangular cross-section wave guide, a body of ferromagnetic material having gyromagnetic properties positioned within said further guide length, and means for impressing selectively upon said body a substantially uniform D.-C. polarizing magnetic field and for adjusting the intensity thereof, said means being so arranged that said field be applied in a direction making an angle comprised between 40 and 50 degrees with the longitudinal axis of said further guide length and substantially parallel to the narrower lateral faces thereof, said means further including switching means for simultaneously establishing or suppressing said polarizing magnetic fields in said short-circuit devices; said body having the shape of a circular cylindrical rod having its revolution axis substantially perpendicular to the narrower lateral faces of said guide, and said body filling a substantial part but less than the whole of the cross-section of said guide and being located in a position substantially symmetrical with respect to the broader and narrower lateral faces of said guide.

8. A four-way ultra-high frequency switch comprising a circulator having four ports consisting of the end parts of two rectangular cross-section guide lengths, wherein each one of said guide lengths is provided with a short-circuit device comprising a further length of rectangular cross-section wave guide, a body of ferromagnetic material having gyromagnetic properties positioned within said further guide length, and means for impressing selectively upon said body a substantially uniform D.-C. polarizing magnetic field and for adjusting the intensity thereof, said means being so arranged that said field be applied in a direction making an angle comprised between 40 and 50 degrees with the longitudinal axis of said further guide length and substantially parallel to the narrower lateral faces thereof, and wherein switching means are provided for separately establishing at will said polarizing magnetic field in each said short-circuit device; said body having the shape of a circular cylindrical rod having its revolution axis substantially perpendicular to the narrower lateral faces of said guide, and said body filling a substantial part but less than the whole of the cross-section of said guide and being located in a position substantially symmetrical with respect to the broader and narrower lateral faces of said guide.

9. A resonant cavity comprising a length of rectangular cross-section wave guide, wherein short-circuit devices are provided at each end of said length, each one of said short-circuit devices comprising a body of ferromagnetic material having gyromagnetic properties positioned within said guide length and means for impressing selectively upon said body a substantially uniform D.-C. polarizing magnetic field and for adjusting the intensity thereof, wherein said means being so arranged that said field be applied in a direction making an angle comprised between 40 and 50 degrees with the longitudinal axis of said guide and substantially parallel to the narrower lateral faces thereof; said body having the shape of a circular cylindrical rod having its revolution axis substantially perpendicular to the narrower lateral faces of said guide, and said body filling a substantially part but less than the whole of the cross-section of said guide and being located in a position substantially symmetrical with respect to the broader and narrower lateral faces of said guide.

References Cited in the file of this patent

UNITED STATES PATENTS

| | | |
|---|---|---|
| 2,798,205 | Hogan | July 2, 1957 |

FOREIGN PATENTS

| | | |
|---|---|---|
| 1,169,581 | France | Sept. 15, 1958 |
| 1,042,050 | Germany | Oct. 30, 1958 |
| 815,689 | Great Britain | July 1, 1959 |
| 817,585 | Great Britain | Aug. 6, 1959 |

OTHER REFERENCES

Lomer: "IRE Transactions on Microwave Theory and Techniques," July 1958, pages 264–267.

"Modern Advances in Microwave Techniques," edited by J. Fox, Brooklyn Polytechnic Institute, pages 221–224.